May 9, 1967  P. A. GLORIOSO  3,319,039
CONDENSER DISCHARGE STUD WELDING APPARATUS
Filed April 29, 1963

INVENTOR.
Paul A. Glorioso
BY Owen + Owen
ATTORNEYS

3,319,039
CONDENSER DISCHARGE STUD WELDING
APPARATUS
Paul A. Glorioso, Amherst, Ohio, assignor to Gregory Industries, Inc., Lorain, Ohio, a corporation of Michigan
Filed Apr. 29, 1963, Ser. No. 276,483
4 Claims. (Cl. 219—98)

This application is a continuation-in-part of my co-pending application Ser. No. 99,550, filed Mar. 30, 1961, now Patent 3,136,880, issued June 9, 1964.

This invention relates to the art of end welding studs and more specifically to condenser or capacitor discharge stud welding.

In the welding of studs to a workpiece by employing a drawn arc, an end of the stud is first held against the workpiece in the approximate position in which it is to be welded and is then retracted to draw a pilot arc between the stud and the workpiece. The arc is subsequently increased in intensity to establish a welding arc of sufficient intensity to melt some of the end of the stud and the surface of the workpiece. The stud is then plunged from its retracted position into engagement with the workpiece with the arc being extinguished substantially at the time the stud engages the workpiece. The molten metal is then allowed to cool and solidify to complete the weld.

In the welding of large studs to heavy workpieces, a continuous source of power delivering a substantial amount of heat is satisfactory because the excess heat can be dissipated without damaging either the stud or the workpiece. In the welding of studs to thin workpieces, however, an excessive amount of heat will burn a hole completely through the workpiece. For such welding, it has been found that a condenser can be used as the power supply to provide a welding arc for a very short period of time which is sufficient to melt only the surface of the thin workpiece, in the area in which the stud will be attached, without burning through the workpiece.

While the short duration of the arc established by discharge of a condenser is advantageous for welding studs to thin workpieces, the short duration of the arc also renders the use of a condenser discharge for stud welding of the drawn-arc type very difficult because it is almost impossible to properly coordinate the arc with the movement of the stud.

If a resistance is used in series with a condenser, the total energy of the condenser discharge will be spread across a longer period of time. Unfortunately, any such resistance sufficiently great to provide the required longer period of time will also lower the intensity of the electrical discharge to the point that insufficient heat may be attained for welding.

The present invention relates to apparatus for stud welding utilizing an improved condenser discharge for the welding power which overcomes the above disadvantages. The discharge is spread over a longer period of time by means of impedance without undue loss in energy so that effective welds can be made with proper coordination between the discharge and movement of the stud.

In summary, the invention primarily relates to capacitor discharge stud welding which includes a high voltage source and a low voltage source with the low voltage source connected in series with a switch, the stud and the workpiece, and a relay for initiating the welding cycle when the stud and the workpiece are in contact and the switch is closed. The invention also relates to capacitor discharge stud welding in which a coil of the welding tool is energized by a capacitor.

It is, therefore, a principal object of the invention to provide an improved condenser discharge power source for drawn-arc stud welding.

Another object of the invention is to provide a condenser discharge power source capable of producing an arc of sufficient intensity for a longer period of time to coordinate and relate the discharge to the mechanical movement of a stud.

Still another object of the invention is to provide a condenser discharge circuit maintaining a charge on a condenser within specified limits regardless of variations in the supply line voltage.

Yet another object of the invention is to provide a welding circuit employing a condenser discharge power source, which circuit provides closer control over the welding operation than heretofore possible.

Various other objects and advantages of the invention will be apparent from the following detailed description of a preferred embodiment thereof, reference being made to the accompanying drawing, in which.

Figure 1:
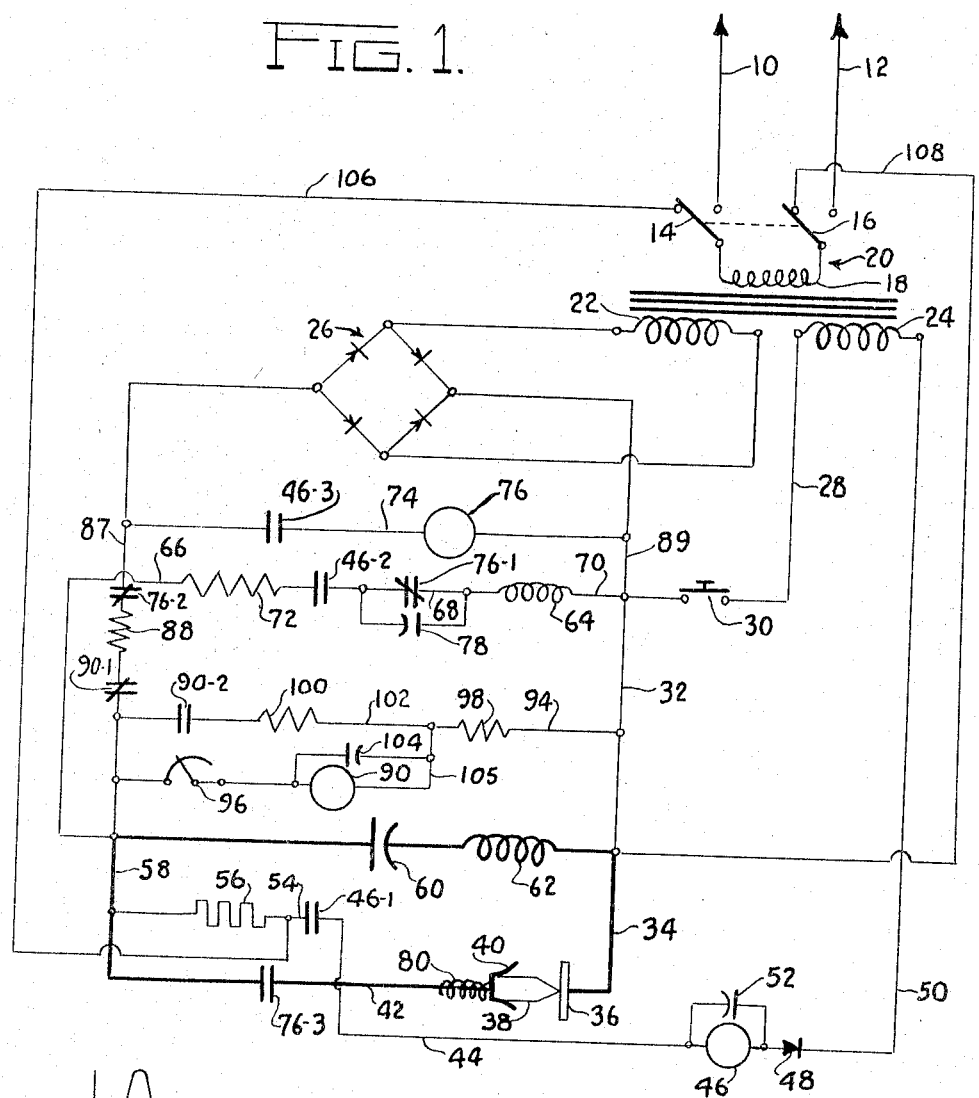
FIG. 1 is a schematic wiring diagram for a circuit embodying the invention.

Referring to the drawings, and more particularly to FIG. 1, a pair of main leads 10 and 12 are connected to a suitable source of power such as a conventional 110-volt A.C. source which is almost always readily available to provide the greatest utility for the welding system according to the invention. Although the voltage at the usual nominal 110-volt source is fairly uniform at most outlets, the voltage sometimes will drop below the recommended operating voltage level, particularly where temporary lines are extended over long distances, such as at new construction sites. The new welding system, however, enables welding to continue without variation even though relatively large drops in voltage occur.

The main leads 10 and 12 are connected through poles 14 and 16 of a two-pole switch to a primary winding or coil 18 of a main transformer 20. Separate secondary windings or coils 22 and 24 provide two separate sources of alternating current at different voltages with the voltage available from the secondary winding 22 being greater than that available from the secondary winding 24, for example, these being 175 volts and 32 volts respectively. The alternating current from the secondary winding 22 is rectified by a conventional rectifier indicated at 26.

The low voltage secondary winding 24 is connected through a line 28 to a starting switch or button 30 which usually is located on a handle of a welding tool for easy access by an operator. When the switch 30 is closed, the winding 24 is electrically connected through the line 28, a line 32, and a heavy conductor 34, to a workpiece 36 which can be of any size or shape. When a stud 38, held in a chuck 40, is in contact with the workpiece 36, a circuit is completed for the winding 24 through another heavy conductor 42, a line 44, a control relay 46, a half-wave rectifier 48 and a line 50. Thus, with the stud 38 in contact with the workpiece 36, the control relay 46 will be actuated when the start switch 30 is closed.

A condenser 52 across the control relay 46 maintains the relay closed for the half-wave current and also assures that the relay 46 will remain closed or actuated for a period of time greater than the period required for a weld, even though the start switch 30 is released immediately by the operator. The use of the separate low voltage source of current in this instance is particularly advantageous because it cannot harm or even startle an operator if he should be in contact with the workpiece 36 and the stud 38 when they are spaced apart and the switch 30 is closed.

When the control relay 46 is actuated, it establishes a pilot arc by retracting the stud 38 and by actuating a contactor. The pilot arc is established by the closing of normally open contacts 46-1 in a line 54 which contains a pilot arc coil or resistance 56. This line is electrically connected through a heavy conductor 58 to a main capacitor 60. The capacitor 60, in turn, is connected through a main inductance coil 62 and the conductor 34 to the workpiece 36. The circuit is completed through the heavy conductor 42 and the line 54 so that a pilot arc is thereby readied between the workpiece 36 and the stud 38. The pilot arc will be of low intensity because of the limiting resistance of the coil 56.

At the same time, the stud 38 and the chuck 40 are retracted from the workpiece 36 by an electromagnetic coil 64 to which current is supplied from the capacitor 60 through lines 66, 68, and 70 and the line 32 when contacts 46-2 are closed. This enables the coil 64 to receive more uniform current than the rectified current available from the transformer 20; closer control over the operation of the coil and the lift and plunge strokes of the stud are thereby achieved. The contacts 46-2 are closed at the same time as the contacts 46-1 so that the stud begins to retract and the pilot arc is established substantially simultaneously. The line 66 also contains a suitable limiting resistor 72.

To continue the operation, third contacts 46-3 in a line 74 are closed to actuate a contactor or heavy duty relay 76 which does not close, because of its inertia, until after the pilot arc is established and the stud is retracted. The contactor 76 first opens normally closed contacts 76-1 and 76-2. An arc-suppressing capacitor 78 is connected across contacts 76-1 and these contacts open the line 70 to de-activate the lifting coil 64. By this time, due to the relatively slow action of the contactor 76, the stud 38 has already been retracted to its remote position away from the workpiece 36. With the de-activation of the coil 64, a spring 80, which is compressed when the stud 38 is retracted, then plunges the stud 38 against the workpiece 36 as is well known in the art.

The contacts 76-2, when opened, separate the main capacitor 60 from the power source so that the capacitor 60 cannot charge as it is discharging through the stud 38 and the workpiece 36.

Finally, normally open contacts 76-3 in the line 42 are closed to complete a circuit through the stud 38, the workpiece 36, the heavy conductor 34, the inductance coil 62, the main capacitor 60, and the line 58. The contactor 76 is designed so that the contacts 76-3 close slightly after the contacts 76-2 open to make sure that the capacitor discharge circuit is isolated at the time the main capacitor 60 is discharged. In practice, although the contacts 76-3 also close after the contacts 76-1 open, nevertheless the capacitor 60 begins to discharge before the stud 38 actually begins its plunge stroke, due to the mechanical delay involved in initiating the plunge stroke after the lifting coil 64 is de-activated. Preferably, the discharge of the capacitor 60 should begin slightly before the plunge stroke begins and end slightly after the stud engages the workpiece so that the peak of the capacitor discharge occurs during the plunge stroke.

Figure 2:
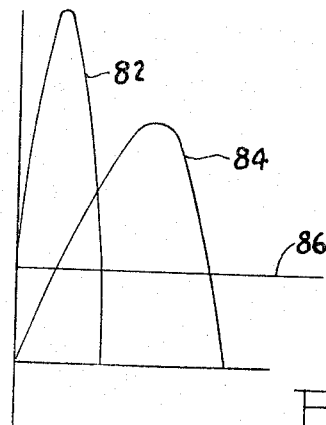
FIG. 2 is a graph illustrating a conventional, uncontrolled condenser discharge wave in comparison with a condenser discharge wave provided by the circuit of FIG. 1.

Because of the series connected inductance coil 62, the current discharge is spread over a longer period of time as will be evident from FIG. 2 which shows a typical discharge curve 82 for an unrestricted capacitor discharge and a discharge curve 84 representing the discharge of the main capacitor 60 in series with the inductance coil 62. For the typical discharge curve 82, the peak current is very high but the decay is rapid; whereas, with the capacitor and inductance combination, the discharge curve 84 is spread out so that the current peak is lower and the current rise and decay are much slower. For example, the unrestricted discharge time may be in the order of one to two milliseconds whereas the time required for the discharge of inductance-capacitor combination may be four to seven milliseconds. As also evident from FIG. 2, the duration of the curve 84 above a reference line 86, which represents current sufficient to produce a weld, is greater than the duration of the corresponding portion of the curve 82.

Ideally, the operation of the contacts 76-1 and 76-3 is arranged so that the capacitor 60 begins to discharge slightly before the actual initial movement of the plunge stroke of the stud, so that the plunge stroke begins as the curve 84 crosses the reference line 86 on its way up and the plunge stroke ends, with the stud 38 contacting the workpiece 36, as the curve 84 crosses the reference line 86 on the way down.

The extended discharge is important to successful condenser discharge operation in stud welding because it enables proper coordination between the rate of current flow and the plunge stroke of the stud. Hence, it eliminates the need for mechanically establishing an arc by the use of thin tips on the studs which prior capacitive welding devices have had to employ in order to establish an arc and permit movement of the stud to the workpiece while the high peak discharge of the capacitor occurs.

After a weld is completed, the capacitor 60 will be completely discharged and, therefore, must be recharged before the next weld. Toward this purpose, when a weld is completed and the starting switch 30 is released and opened, the control relay 46 drops out to open its related contacts. Opening of the contacts 46-1 and 46-2 produces no effect since the capacitor 60 has been discharged and the contacts 76-1 in the line 68 are already open. However, opening of the contacts 46-3 drops out the contactor 76 which closes its contacts 76-1 and 76-2 and opens it contacts 76-3. The closing of the contacts 76-1 has no effect because the contacts 46-2 are now open, and the opening of the contacts 76-3 has no effect because the capacitor 60 is discharged. However, the closing of the contacts 76-2 again connects the capacitor 60 with the power supply or transformer 20 to enable it to be charged for another welding cycle.

The welding system includes a control circuit for the charging of the capacitor 60 which produces much closer control over the charging than heretofore possible. With the contacts 76-2 closed, the rectifier 26 is connected with the capacitor 60 through a line 87, a limiting resistor 88, and a line 89. The resistor 88 limits current particularly during the first part of the charging when the capacitive resistance in the circuit is practically zero. As the voltage builds up in the capacitor 60, the same voltage is impressed across a charge control relay 90 which is in parallel with the capacitor 60 by means of lines 92 and 94. A rheostat 96 is also in series with the control relay 90 to adjust the sensitivity of the relay and to control the range of the charging voltage impressed on the capacitor 60. A fixed, limiting resistor 98 also is in the line 94 in series with the rheostat 96 and the control relay 90 to control the voltage across the relay 90 and the charge impressed on the capacitor 60. As the charge on the capacitor 60 increases and the voltage across it correspondingly rises, the voltage across the relay 90 also rises until it is sufficient to actuate the relay 90.

When the actuating voltage of the relay 90 is reached, normally closed contacts 90-1 are opened to separate the capacitor 60 from the power supply. At the same time, contacts 90-2 in series with a resistor 100 in a line 102 close to place the resistor 100 and the relay 90 electrically in parallel. The relay 90 and the resistor 100, which are in parallel, are in series with resistor 98. This series, parallel circuit is then in parallel with the capacitor 60 through lines 94, 32, 92 and 89. A capacitor 104 is placed across the control relay 90 to stabilize its operation and to prevent premature actuation or de-activation because of rapid changes in current.

Immediately upon closing of the contacts 90-2, the voltage across the control relay 90 drops, with the value of resistors 98 and 100 being chosen so that the current flowing through the line 92 and a line 105 will be just sufficient to keep the relay 90 actuated. Current then flows through the relay 90, the resistor 100, and the resistor 98 from the capacitor 60 and the relay 90 continues to remain closed. However, the current decreases as the capacitor 60 discharges and, since the relay 90 initially is receiving current just above its drop-out point, it soon drops out as the capacitor 60 discharges. At this time, the contacts 90-2 again open and the contacts 90-1 then again close to cause current from the power source to again charge the capacitor 60. If there is any leakage in any of the circuitry causing the capacitor 60 to discharge, nevertheless the relay 90 will continue to maintain the capacitor 60 at its required charge. This enables ultimate control to be attained over the condenser discharge for the welding operation.

When welding is completed or is to be interrupted for an extended period, the double pole switch is thrown to disconnect the power source by opening the lines 10 and 12. The poles 14 and 16 then connect lines 106 and 108 together through the primary coil 18 to discharge the condenser 60 through the coil 18 and the inductance coils 56 and 62. This eliminates the possibility of an accidental discharge of the condenser 60.

Various modifications of the above described embodiment of the invention will be apparent to those skilled in the art and it is to be understood that such modifications can be made without departing from the scope of the invention, if they are within the spirit and tenor of the accompanying claims.

I claim:

1. Apparatus for welding studs and the like by means of a capacitor discharge, said apparatus comprising means for holding and retracting a stud to sequentially position the stud against a workpiece and thereafter to retract the stud to a predetermined position from the workpiece to form a gap therebetween, means to return the stud to the workpiece, a capacitor, first energy discharge circuit means connecting said stud and said workpiece in circuit with said capacitor and including means restricting the energy discharge of said capacitor to establish a pilot arc between said stud and said workpiece when said stud is retracted from said workpiece, a first power source, second circuit means connecting said capacitor to said power source for charging said capacitor, third discharge circuit means connecting said capacitor with the stud and with the workpiece to establish an arc of welding intensity therebetween when the stud is spaced from the workpiece and to sustain the arc until the stud is returned to the workpiece, a power source of lower voltage than said first power source, fourth circuit means connecting said low voltage source across said stud and said workpiece, said fourth means including means for closing said first energy circuit means when connected with said low voltage source through said fourth circuit means, and manually-operable means for connecting said low voltage source with said closing means at a predetermined time with the stud and workpiece being in electrical contact.

2. Apparatus for welding studs and the like by means of a capacitor discharge, said apparatus comprising means for holding and retracting a stud to sequentially position the stud against a workpiece and thereafter to retract the stud to a predetermined position from the workpiece to form a gap therebetween, said holding and retracting means including an electromagnetic coil, means to return the stud to the workpiece, a capacitor, first discharge circuit means connecting said coil and said capacitor, said first discharge circuit means including means for opening and closing said circuit whereby said coil is energized by a partial discharge of said capacitor when said first circuit means is closed, second discharge circuit means connecting said stud and said workpiece with said capacitor, said second discharge circuit means including means for opening and closing said second discharge circuit means for enabling said capacitor to discharge energy across a gap resulting between said stud and said workpiece when said stud is retracted to cause an arc of welding intensity therebetween, and means for controlling said first and second opening and closing means to cause said first means to close and to retract the stud prior to the establishment of the welding arc between the stud and the workpiece.

3. Apparatus according to claim 2 and additional circuit means for discharging said capacitor automatically when said power source is shut off.

4. Apparatus for welding studs and the like by means of a capacitor discharge, said apparatus comprising means for holding and retracting a stud to sequentially position the stud against a workpiece and thereafter to retract the stud to a predetermined position from the workpiece to form a gap therebetween, means to return the stud to the workpiece, a capacitor, a first power source, first circuit means connecting said capacitor to said first power source for charging said capacitor, discharge circuit means connecting said capacitor with the stud and the workpiece to establish an arc of welding intensity therebetween when the stud is spaced from the workpiece and to sustain the arc until the stud is returned to the workpiece, a relay in parallel with said capacitor in said first circuit means, said relay having normally-closed contacts associated with said first circuit means, said relay being actuated to open said contacts when the capacitor has received a predetermined charge, a resistor in parallel with said relay, said relay having a second pair of normally-open contacts in series with said resistor whereby said resistor is placed in parallel with said relay each time the relay is actuated.

References Cited by the Examiner
UNITED STATES PATENTS

| | | | |
|---|---|---|---|
| 1,708,072 | 4/1929 | Alexander | 219—131 X |
| 2,110,436 | 3/1938 | Candy | 219—131 X |
| 2,184,628 | 12/1939 | Watson | 219—113 |
| 2,214,868 | 9/1940 | Welch | 219—131 X |
| 2,315,093 | 3/1943 | Languepin | 219—113 X |
| 2,315,625 | 4/1943 | King | 219—131 X |
| 2,364,372 | 12/1944 | Kenrick | 219—131 X |
| 2,449,456 | 9/1948 | Croco et al. | 219—131 X |
| 3,136,880 | 6/1964 | Glorioso | 219—98 |

RICHARD M. WOOD, *Primary Examiner.*

R. F. STAUBLY, *Assistant Examiner.*